US005478063A

United States Patent [19]

Linder et al.

[11] Patent Number: 5,478,063

[45] Date of Patent: Dec. 26, 1995

[54] DEVICE FOR CHARGING AN INSETTING MACHINE FOR PRINTED PRODUCTS

[75] Inventors: Heinz Linder, Zofingen; Albert Eugster, Strengelbach, both of Switzerland

[73] Assignee: Grapha-Holding AG, Hergiswil, Switzerland

[21] Appl. No.: 204,339

[22] PCT Filed: Jun. 29, 1993

[86] PCT No.: PCT/CH93/00164

§ 371 Date: Mar. 14, 1994

§ 102(e) Date: Mar. 14, 1994

[87] PCT Pub. No.: WO94/02326

PCT Pub. Date: Feb. 3, 1994

[30] Foreign Application Priority Data

Jul. 15, 1992 [CH] Switzerland .......................... 02230/92

[51] Int. Cl.[6] ............................ B65H 5/30; B65H 29/00; B65G 47/24

[52] U.S. Cl. ............................ 270/57; 270/55; 198/417; 271/6; 271/185; 271/272

[58] Field of Search ................................ 270/54, 55, 57; 271/272, 185, 186, 275, 4, 6, 3.1; 198/417, 831, 626.1, 604, 841

[56] References Cited

U.S. PATENT DOCUMENTS

| | | | |
|---|---|---|---|
| 2,028,235 | 1/1936 | Needham . | |
| 3,776,543 | 12/1973 | Edwards . | |
| 4,236,482 | 12/1980 | Gingerich et al. | 271/275 X |
| 4,380,333 | 4/1983 | Turner | 271/272 |
| 4,457,422 | 7/1984 | Hurd | 198/604 |
| 4,542,818 | 9/1985 | Pavie | 271/186 X |
| 4,907,791 | 3/1990 | Higgins et al. | 271/6 X |
| 5,026,038 | 6/1991 | Weller et al. | 271/272 X |
| 5,080,337 | 1/1992 | Mayer et al. | 270/54 X |
| 5,088,711 | 2/1992 | Newsome | 271/3.1 X |
| 5,152,512 | 10/1992 | Yoshida et al. | 271/272 X |
| 5,238,239 | 8/1993 | La Chapelle | 271/275 |

FOREIGN PATENT DOCUMENTS

| | | | |
|---|---|---|---|
| 73388 | 3/1983 | European Pat. Off. | 198/417 |
| 1922257 | 11/1970 | Germany . | |
| 2084966 | 4/1982 | United Kingdom . | |

*Primary Examiner*—John E. Ryznic
*Attorney, Agent, or Firm*—Spencer, Frank & Schneider

[57] ABSTRACT

An arrangement for charging successive pockets on a conveyor path of an insetting machine with inset products with a given edge first. A sheet feeder disposed to convey the inset products approximately perpendicular to a conveying direction of the insetting machine is provided. Above the pockets a conveyor segment ends that is disposed downstream of the sheet feeder. The conveyor segment is formed by two endless adjacent flat belts and conveys the inset products from the sheet feeder to the pockets of the insetting machine. The inset products are grasped between respective conveying surfaces of the flat belts. Deflector rollers circulate the flat belts.

12 Claims, 3 Drawing Sheets

DEVICE FOR CHARGING AN INSETTING MACHINE FOR PRINTED PRODUCTS

BACKGROUND OF THE INVENTION

The invention relates to a device for charging an insetting machine with printed products, the insetting machine having successive pockets that are sequentially moved along a conveyor path in a conveying direction. Inset products are charged with a given edge first into the pockets.

Known insetting machines are charged by sheet feeders that are disposed above the conveyor path of the successively-following, pocket-like receiving elements and have a conveyor or a stacking hopper.

In the latter case, because of their position above the conveyor path, which is disadvantageous with respect to operation, the sheet feeders are charged manually from a platform raised from the floor. This work requires great physical effort and involves risks of accidents, as well as relatively long access paths to the sheet feeders.

SUMMARY OF THE INVENTION

It is therefore an object of the invention to create a device for charging an insetting machine with printed products that permits the insetting machine to be allocated a corresponding sheet feeder that can be operated ergonomically.

This object is attained in accordance with the invention by an arrangement comprising a sheet feeder disposed to convey the inset products approximately perpendicular to the conveying direction of the insetting machine. A conveyor segment is disposed downstream of the sheet feeder and ending above the conveyor path of the insetting machine for conveying the inset products from the sheet feeder to the pockets of the insetting machine. The conveyor segment is formed by two endless flat belts having respective conveying surfaces that are adjacent to one another for grasping the inset products therebetween. Additionally, deflector rollers for circulating the flat belts are provided. The printed products can thereby be conveyed to the pockets in a simple and less tiring procedural manner. The sheet feeder stack can also be charged by a conveyor or a different conveyor element, for example conveyor belts.

Transport of the printed products so that they need not be turned on the way from a sheet feeder mounted at a side of the conveyor path of the insetting machine to the pockets of the insetting machine is problematic, because, due to the printed products, insufficient stability, the printed products would have to be clamped at at least two distanced locations on the flat belts to prevent deformation.

The flat belts of the device of the invention are preferably guided over an axis of a reversing roller seated above the path and disposed approximately parallel to the conveying direction of the insetting machine; afterwards, the flat belts form an approximately vertical, downwardly-oriented guide gap through which the surfaces or formed run of the flat belts are rotated together by approximately 90°. The flat belts are acting as conveyors. This structural measure permits a simple and effective configuration of the conveyor segment.

A device in accordance with the invention, having a sheet feeder that is principally known per se and is essentially formed by a stacking hopper and a downstream gripper drum, proves advantageous when the flat belts form an undershot conveyor segment with the gripper drum.

It is provided in this case that the flat belts are disposed approximately central with respect to the drum width and have approximately its turning radius.

The end of the conveyor segment in the conveying direction is advantageously configured as a feed opening formed by the flat belts and communicating with an output end of the stacking hopper. The feed opening permits a friction-free transfer of a printed product from the sheet feeder to the conveyor segment.

It is thus possible to arrange the folded edge of the printed products located in the stacking hopper to face away from the pockets of the insetting machine.

Alternatively, in a device in accordance with the invention, a sheet feeder known per se and essentially comprising a stacking hopper and a downstream gripping drum is disposed upstream of the conveyor path. At the forward end of the conveyor path an undershot conveyor channel is formed by a reversing roller and the flat belts.

An undershot conveyor channel whose forward end is configured as a feed opening that communicates with the output opening of the gripping drum proves advantageous for this.

This latter embodiment of the device in accordance with the invention provides that the folded edges of the printed products, specifically the one edge of a card or the like, located in the stacking hopper are turned toward the conveyor path of the insetting machine.

To be able to reliably execute the charging of the pockets, a guide defined by conducting surfaces can be provided on the rear sides of the conveyor segment formed by the flat belts. The guide prevents the lateral regions of the inset products from being lifted, particularly on the deflector roller.

The guide on the deflector roller is advantageously configured with an upper and a lower guide surface, and extends approximately to the conveying end of the deflector roller.

So that an extensively friction-free insetting procedure in the pockets of the insetting machine is achieved, the guide gap can be displaced into a position that is inclined in a direction counter to the conveying direction of the insetting machine.

Because of this, a flat impact of the conveyed inset products against the walls of the pockets can take place, i.e., the inset products reach their end position in the pockets without any particular delay.

An adjustable conducting element provided for orienting the inset products in front of the pockets can be secured to each side of the conveyor segment.

It is useful when the device of the invention is configured to be displaceable so that it can optionally be advanced along the conveyor path of the insetting machine.

BRIEF DESCRIPTION OF THE DRAWINGS

Further advantages and details of the invention ensue from the following description of two embodiments with reference to the drawing figures. Shown in these are.

DETAILED DESCRIPTION OF THE PREFERRED EMBODIMENTS

Figure 1:
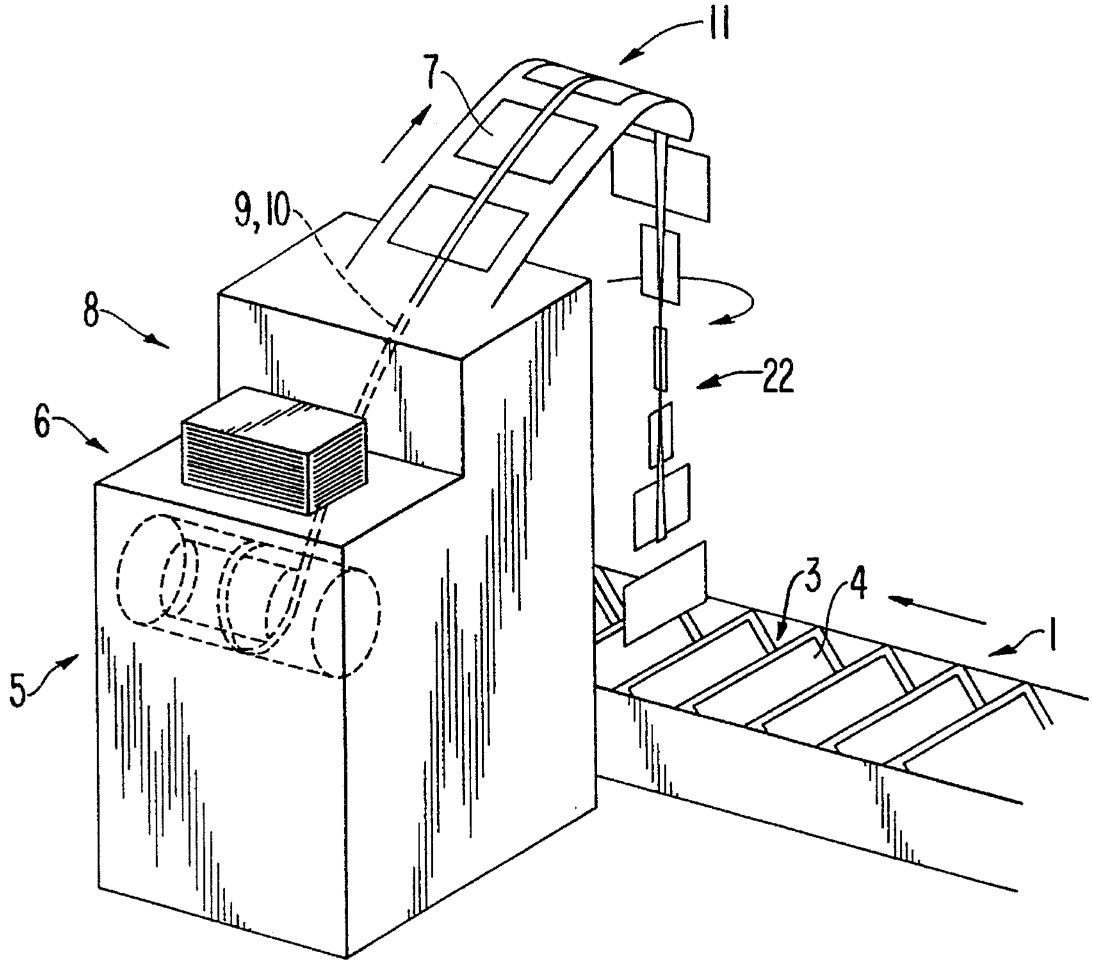
FIG. 1 a simplified representation of the device in accordance with the invention, FIG. 2 a schematic, longitudinal-section representation of the device in accordance with FIG. 1, and FIG. 3 a schematic, longitudinal-section representation of an alternative embodiment of the device in accordance with FIG. 1.

FIG. 1 shows the conveyor path 1 of a partially illustrated insetting machine 2 (see FIG. 2) and the conveying direction of the printed products 4 that are opened in the successively-following pockets 3.

A device 5 having a sheet feeder 6 for charging insetting machine 2 and pockets 3 along conveyor path 1 is disposed to the side of conveyor path 1. The conveying flow of the printed products 4 is effected by sheet feeder 6, approximately perpendicular to the conveying direction of insetting machine 2, and the inset products 7 are removed at the underside of a manually formed stack 8. The operating mode and structural design of sheet feeder 6 are known, and therefore require no additional description. Two endless flat belts 9, 10 are adjacent to each other by their running surfaces and circulate on guide rollers to form a conveyor segment 11 that ends above the conveyor path and adjoins the output end of sheet feeder 6. The inset products 7 delivered by sheet feeder 6 travel between the close-fitting running surfaces of the flat belts 9, 10, that are guided in the region of conveyor segment 11 over an axis 12 of a reverse deflector roller 13 (FIGS. 2 and 3) axis 12 is disposed above conveyor path 1 and extends approximately parallel to the conveying direction of insetting machine 2. Afterward, flat belts 9, 10 are rotated approximately 90° on a common conveyor segment 22, so that a conveying end of the conveyor segment is nearly parallel to the longitudinal sides of the openings of pockets 3 of insetting machine 2, and is oriented to extend approximately perpendicular to the insetting machine.

After the end of conveyor segment 22, flat belts 9, 10 are separated and individually guided back to the output end of sheet feeder 6 via deflector rollers.

Figure 2:
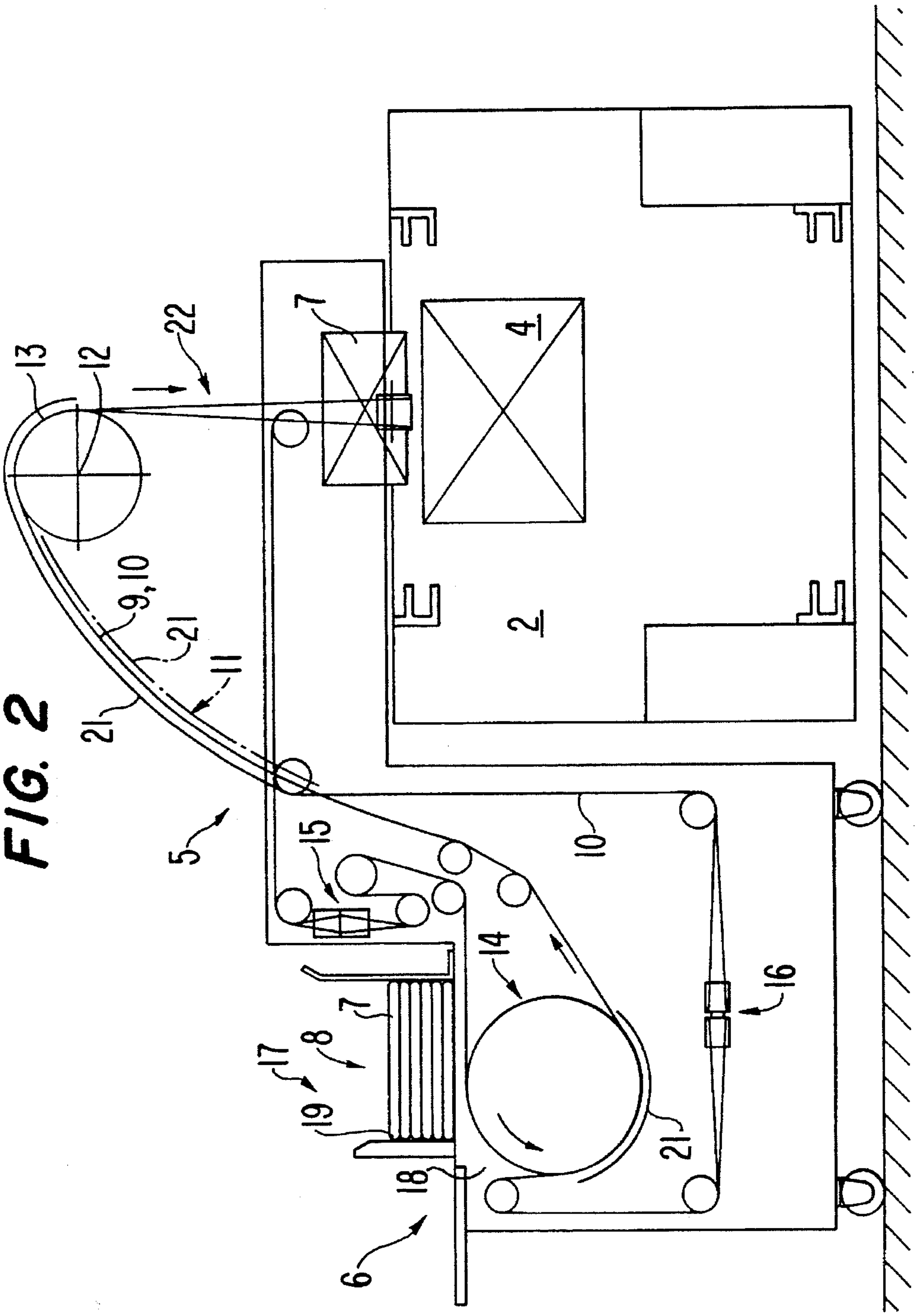

In an embodiment of the device 2 of the invention shown in FIG. 2, flat belts 9, 10 disposed one above the other form a conveyor section undershooting at gripping drum 14 of sheet feeder 6. Drum 14 is disposed downstream of stack 8. The one flat belt 9 is fed via gripping drum 14, and the other flat belt 10 is fed from the side toward gripping drum 14.

The forward end (i.e., a sheet feeder end) of conveyor segment 11 formed in this way is distinguished by a feed opening 18 that communicates with stacking hopper 17.

Because of the rotation of flat belts 9, 10 around the longitudinal axis of conveyor segment 22 above conveyor path 1, on the return path to sheet feeder 6 these flat belts 9, 10 are rotated back to the same extent at points 15, 16 to reach their original position.

The folded edges 19 of inset products 7 are thereby arranged to face away from insetting machine 2.

Figure 3:
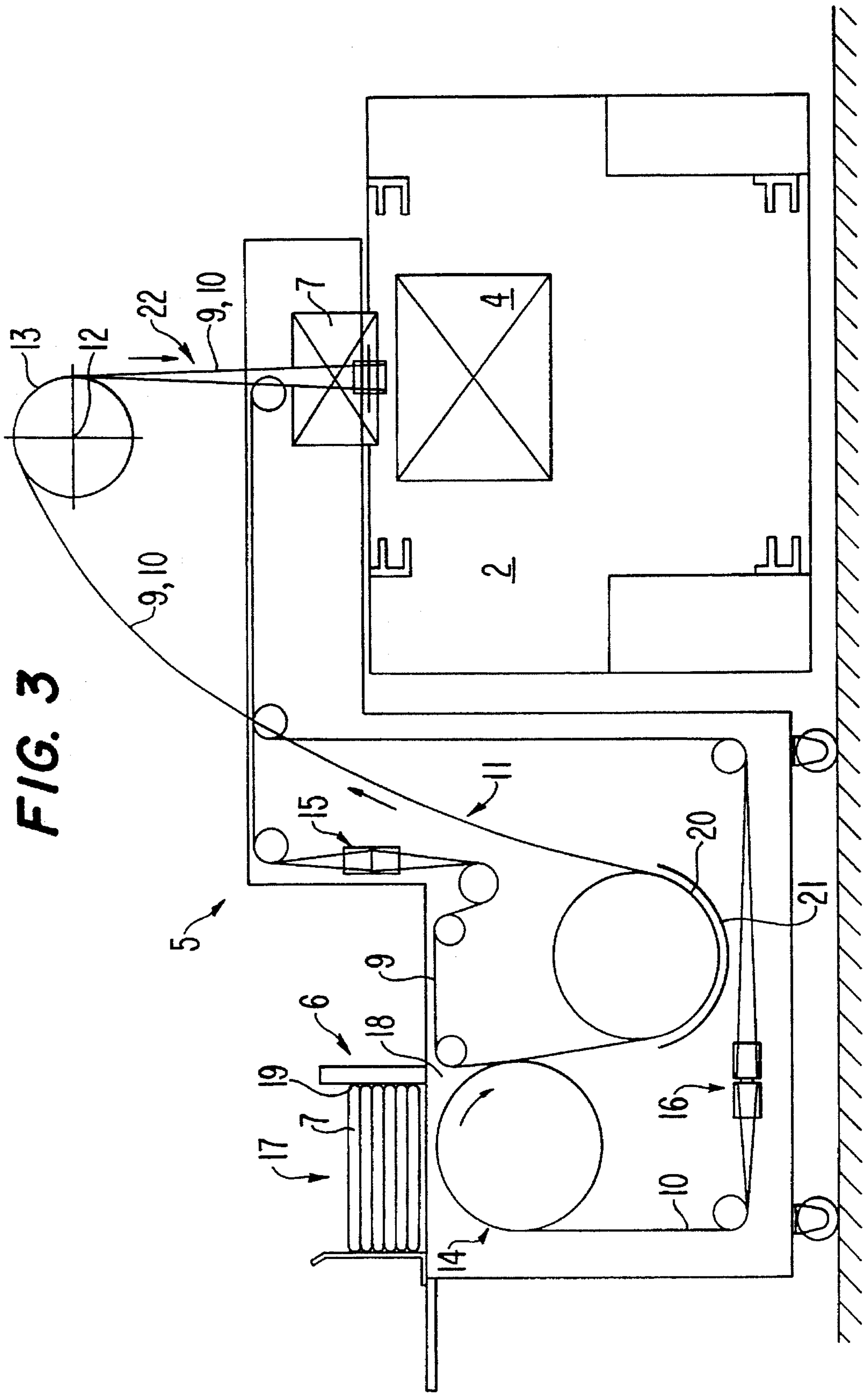

FIG. 3 illustrates an alternative embodiment of the device 2 of the invention, in which conveyor segment 11 extends undershot to form an undershot conveyor channel around a deflector roller 20 following upstream of gripping drum 14, and the folded edges of inset products 7 in stacking hopper 17 face insetting machine 2. Flat belts 9, 10 again form a feed opening 18 at gripping drum 14, which conveyor segment 11 adjoins.

The folded edges 19 of the inset products 7 located in stacking hopper 17 and the folded edge of a card, respectively, face pockets 3 of conveyor path 1.

To assure reliable transport of inset products 7 into pockets 3 of insetting machine 2, guides 21 are provided on conveyor segment II for supporting the lateral overhang of the inset products. This applies to the embodiments in accordance with FIG. 2 and FIG. 3. The embodiment in FIG. 2 has guides 21 in the undershot region of conveyor segment 11 at gripping drum 14 and on the flat segment in front of deflector roller 13, where the inset products 7 are guided between an upper and a lower guide surface until they leave deflector roller 13.

This measure also applies to the embodiment in FIG. 3, with the difference being that, in place of gripping drum 14, deflector roller 20 has a guide 21 in the undershot region.

To aid the insetting process in pockets 3, conveyor segment 22 is displaced into a position inclined counter to the conveying direction of insetting machine 2.

Adjustable conveying elements that act upon inset products 7 are disposed to the side of conveyor section 22.

Finally, device 2 is embodied such that it can be displaced along conveyor path 1.

We claim:

1. An arrangement for inserting successive pockets on a conveyor path of an insetting machine with inset products with a given edge first into the pockets, comprising:

a sheet feeder comprising a stacking hopper and a gripping drum located therebelow, said sheet feeder being disposed to convey the inset products approximately perpendicular to a conveying direction of the insetting machine;

a conveyor segment disposed downstream of said sheet feeder and ending above the conveyor path of the insetting machine for conveying the inset products from said sheet feeder to the pockets of said insetting machine, said conveyor segment being formed by two endless flat belts having respective conveying surfaces that are adjacent to one another for grasping the inset products therebetween, said flat belts forming a conveyor section under-shooting said gripping drum; and at least one deflector roller for circulating said flat belts.

2. A device as defined in claim 1, wherein the flat belts form a feed opening at a sheet feeder end of said conveyor segment, the feed opening being in communication with the stacking hopper.

3. A device as defined in claim 1, wherein the given edge of the inset product located in the stacking hopper comprises a folded edge positioned to face away from the pockets of the insetting machine.

4. An arrangement for inserting successive pockets on a conveyor path of an insetting machine with inset products with a given edge first into the pockets, comprising:

a sheet feeder disposed to convey the inset products approximately perpendicular to a conveying direction of the insetting machine;

a conveyor segment disposed downstream of said sheet feeder and ending above the conveyor path of the insetting machine for conveying the inset products from said sheet feeder to the pockets of said insetting machine, said conveyor segment being formed by two endless flat belts having respective conveying surfaces that are adjacent to one another for grasping the inset products therebetween; and at least one deflector roller for circulating said flat belts and having an axis approximately parallel to the conveying direction and located above the conveyor path, said flat belts being guided over said at least one deflector roller and subsequently rotated together by approximately 90° to form a conveying segment that extends approximately vertically downward toward the conveyor path.

5. A device as defined in claim 4, further comprising a guide on said conveyor segment for supporting the inset products.

6. A device as defined in claim 5, wherein said guide comprises an upper and a lower conveying surface, said guide guiding the inset products to said at least one deflector roller.

7. A device as defined in claim 4, wherein said conveyor segment includes a portion that is inclined counter to the conveying direction.

8. A device as defined in claim 4, further comprising adjustable conveying elements on a side of the conveyor segment.

9. A device as defined in claim 4, further comprising means for displacing the arrangement along the conveyor path.

10. An arrangement for inserting successive pockets on a conveyor path of an insetting machine with inset products with a given edge first into the pockets, comprising:

a sheet feeder comprising a stacking hopper for receiving the inset products, and a gripping drum located below said stacking hopper, said sheet feeder being disposed to convey the inset products approximately perpendicular to a conveying direction of the insetting machine wherein the given edge of a respective inset product located in the stacking hopper comprises a folded edge positioned to face the pockets of the insetting machine;

a conveyor segment disposed downstream of said sheet feeder and ending above the conveyor path of the insetting machine for conveying the inset products from said sheet feeder to the pockets of said insetting machine, said conveyor segment being formed by two endless flat belts having respective conveying surfaces that are adjacent to one another for grasping the inset products therebetween;

at least two deflector rollers for circulating said flat belts; and an undershot conveyor channel at a sheet feeder end of said conveyor segment, said undershot conveyor channel being comprised of one of said at least two deflector rollers and the flat belts.

11. A device as defined in claim 10, further comprising a guide on said conveyor segment for supporting the inset products.

12. A device as defined in claim 11, wherein said guide comprises an upper and a lower conveying surface, said guide guiding the inset products to one of said at least two deflector rollers.

* * * * *